April 28, 1936.  J. M. PATTERSON  2,039,258
VULCANIZING PAD
Filed July 19, 1934
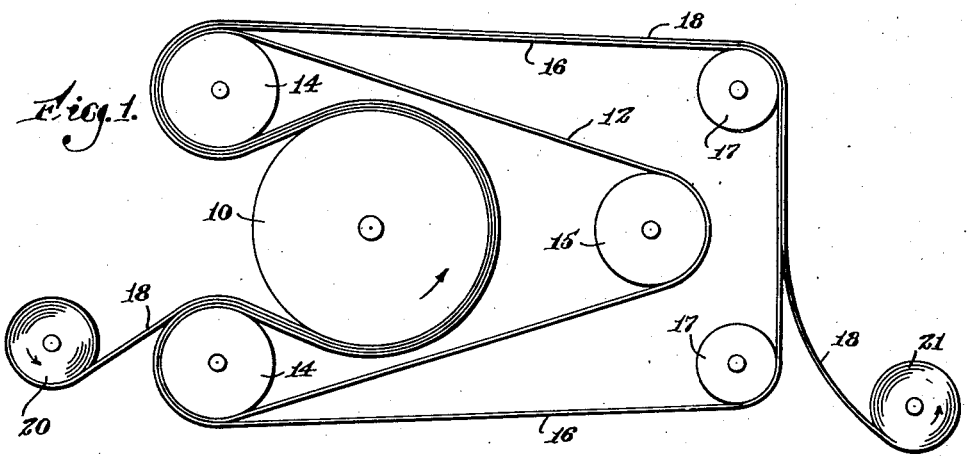
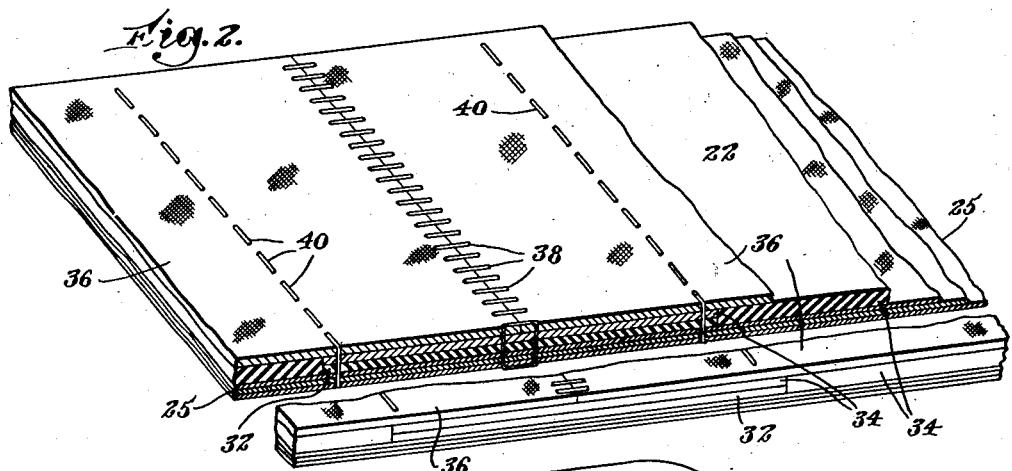
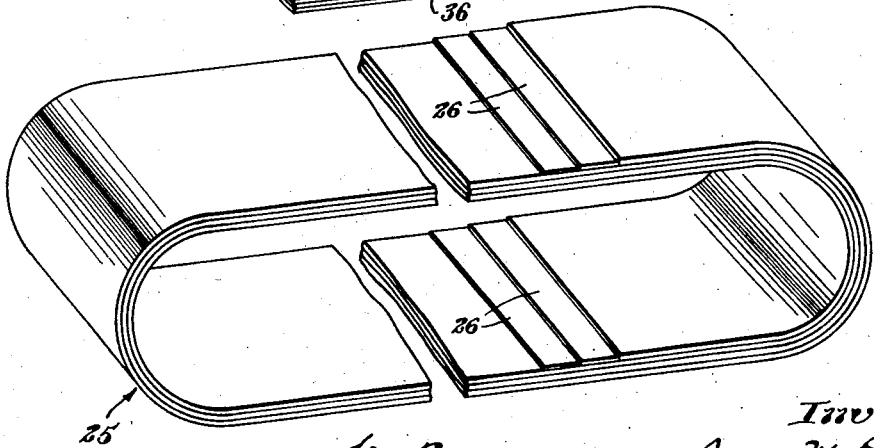
Inventor
James M. Patterson
By Kinney & Witter
Attorney Patented Apr. 28, 1936

2,039,258

UNITED STATES PATENT OFFICE 2,039,258

VULCANIZING PAD

James M. Patterson, Waban, Mass.

Application July 19, 1934, Serial No. 735,984

5 Claims. (Cl. 154—43)

This invention relates to an improved impression pad for use in continuous vulcanizing processes and to the method of making such pads. In molding flat articles or articles in sheet form, it is common practice to interpose an elastic pad between one of the molding surfaces and the unvulcanized compounded rubber which is being forced into contact with the opposed molding surface. The functions of the pad are to even out any surface irregularities in the preformed sheet which is being molded and to exert a stronger pressure on those portions of the sheet, which are forced into cavities in the molding surface. The use of the pad results in a greater allowance tolerance in the dimensions of the stock used for molding and in the production of a better quality of molded article, i. e., a better surface finish, a more uniform gauge or thickness, and fewer rejected pieces of merchandise.

It is highly important that the impression pad be elastic in order to yield to the irregularities in mold contour and also that it conserves its elastic properties over a long period of time. It must also be uniform in thickness as well as capable of holding a surface ply of duck or other suitable material which may be used to impart a surface texture or pattern to one side of the compound which is being molded.

The construction of such pads for use in molding processes carried out in flat heated platen presses is relatively simple. The pad may be built up out of one or more plies of cotton duck, asbestos, or other suitable fabrics impregnated with compounded rubber and the whole mass held together by the vulcanization process. It is also possible to employ other fabrics and materials such as wire, fibre, burlap and the like, and to band them together with elastic materials other than rubber. Since press pads have to withstand the temperature effects incident to vulcanization, it is important that heat-resisting materials be used throughout.

The construction of press pads for continuous vulcanization of sheet materials, however, is relatively difficult since they must be cured in endless or continuous lengths and any defect in the pad will recur as a surface defect in the vulcanized stock. Moreover, since the pad passes in continuous cycle through the vulcanizing press and since the press is set for very definite band pressures, it is important that the gauge or thickness of the pad be extremely uniform as otherwise the contact pressures between the tension band and drum will be greatly increased and the equipment damaged. One of the main difficulties in producing a pad suitable for continuous use lies in the construction and vulcanization of a splice which is sufficient in strength, uniformity of surface texture and thickness. The primary object of my invention is the production of a new and improved continuous impression pad which will provide such a splice meeting these re-requirements and fulfilling the other requirements herein stated.

My improved impression pad embodies a relatively thick intermediate layer of rubber composition having superposed over one face thereof an endless band of rubberized fabric material and over the opposite face a work-engaging surface layer of heavy rubberized fabric, all vulcanized into an integral, compressible and substantially inextensible body. The endless band is preferably constructed from a single fabric strip coiled onto itself in multiple ply formation and having its ends substantially overlapped and gradually stepped down to the thickness of the band by the application of rubber sheets of relatively decreasing thickness to the coil at said ends. The preferred method of making the pad embodies first the construction of this endless band, and thereafter applying the said intermediate layer of rubber composition to the outer face of the band and applying the work-engaging layer of heavy rubberized fabric to the outer face of the intermediate layer.

The work-engaging fabric embodies a strip which must necessarily have its ends joined or spliced in abutting relation to provide an endless band of uniform thickness and, as has been above stated, the construction of such a splice having the requisite strength, uniformity of surface texture and thickness has presented heretofore a considerable problem. In accordance with my invention, this problem has been solved by combining with the said ends a fabric sheet imbedded within the said intermediate layer of the pad directly beneath the ends of the strip. These ends are brought into abutting relation directly over the fabric sheet and are then connected together and to the sheet, preferably by sewing. This sewing, and preferably other additional stitches, extend entirely through the pad at said ends and sheet, thereby providing a secure and uniform joint of a thickness corresponding to the body portion of the pad. The elements of the pad are thereafter vulcanized under pressure in a manner forming the same into a substantial unit.

These and other features of the invention will be best understood and appreciated from the following description of a preferred embodiment thereof, selected for purposes of illustration and shown in the accompanying drawing, in which Fig. 1 illustrates, in side elevation, a continuous vulcanizing machine embodying my invention;

Fig. 2 is a fragmentary perspective and sectional view of my improved impression pad for use in continuous vulcanizing machines; and Fig. 3 is a perspective view of a rubberized fabric strip coiled onto itself in multiple ply formation and illustrating certain steps in the manufacture of my improved pad.

The continuous vulcanizing apparatus shown in Fig. 1 embodies a vulcanizing cylinder 10 adapted to be heated and a presser belt or band 12 passing substantially 270° around the cylinder and over two idlers 14 and an adjustable tensioning idler 15. Cooperating with the presser belt is an endless impression pad 16, this pad passing over idlers 17 and 14 around the vulcanizing cylinder beneath the presser belt. The stock 18 to be vulcanized passes from a supply reel 20 around and in contact with the cylinder beneath the pad 16 and the vulcanized end portion is wound onto a second reel 21. The function of the pad has been heretofore described.

The subject matter of this invention, which will now be specifically described, comprises a new and improved impression pad. This improved pad comprises a relatively thick intermediate layer of rubber compound 22, an endless band 25 of rubberized fabric superposed over one face of the intermediate layer, and a work-engaging surface layer of heavy rubberized fabric superposed over the opposite face of the intermediate layer, all vulcanized into a substantial unit. The endless band 25 may comprise a plurality of superposed layers of rubberized fabric and is preferably formed by coiling a single strip into multiple ply formation, as illustrated in the drawing and hereinafter described.

The first step in the preparation of my improved pad is the formation of the endless band 25. One rubberized fabric which has been used successfully for this purpose is sailcloth frictioned on both sides with a heat resistant rubber compound. A roll of this fabric is mounted at 20 and the fabric is fed into machine between the presser belt 12 and the vulcanizing drum. As the fabric emerges from the drum, it is looped to the desired size and the end again fed into the machine in continuous and overlapping relation to form an endless band of multiple ply, the ends 28 being overlapped a relatively long distance, all as illustrated in Fig. 3. The ends of the band are cut squarely across and are stepped down to the band or coil by the application of rubber sheets 26 of progressively decreasing thickness. Thus is produced an endless and continuous band of multiple ply formation and this band forms the base or initial portion of my improved pad.

A single ply 22 of compounded rubber of any suitable or desired thickness is now run onto the outer surface of the band 25. I have employed a rubber thickness of about .100 inch but it is to be understood that the thickness will depend largely upon the surface for which the pad is to be used. This rubber ply is placed continuously to within eight inches of the starting end and the ends are cut off squarely to provide a gap therebetween. A fill-in piece 32 of like rubber compound of a less thickness is placed in the gap and a piece 34 of suitable fabric, as relatively heavy duck, is inserted over the piece 32, the combined thicknesses of the two pieces being such as completely to fill the gap to a degree flush with the ply 22. The construction of the pad is completed by the application of a work-engaging surface layer 36 of rubberized fabric thereto.

The layer 36 comprises a single strip of fabric, such as comparatively heavy duck, which has been previously frictioned on both sides. This strip placed directly in contact with the rubber ply 22 and the ends are brought into direct abutting relation over the fabric piece 34. The ends are then secured together and to the piece 34 and to the pad by sewing the same entirely through the pad at 38. Other stitches 40 are also preferably made through the pad and piece 34 at the portions thereof remote from the stitches 38. The pad is now vulcanized and completed by continuously passing it through the machine and in contact with the heated drum under pressure of the tension band 12.

From the foregoing description, it will be apparent that I have produced a new and superior pad for use in continuous vulcanizing operations. The gauge or thickness of the pad is extremely uniform, whereby the contact pressures between the tension band and drum will be likewise uniform. The intermediate or body portion 22 provides the elasticity necessary to conform to the irregularities of mold contour and accurately to mold the stock to such contour, and this intermediate portion is composed of high temperature and heat resisting materials capable of withstanding the vulcanizing heat to which the pad is continually exposed in use. The outside portion of the pad, consisting of multiple ply fabric, supplies the necessary tensile strength and toughness to the pad, and the work-engaging surface layer 36 provides the desired surface texture upon the molded stock. It will also be apparent that my novel splice construction gives maximum uniformity of surface smoothness and provides high tensile strength in this portion to the pad. It is believed, therefore, that the pad of my invention is superior in construction and operation to pads heretofore used and that it will give longer life and more efficient service than any heretofore available.

Having thus described my invention, what I claim as new and desire to secure by Letters Patent is:

1. An improved endless impression pad for vulcanizing machines, comprising a relatively thick intermediate layer of rubber compound, an endless band including a single piece of rubberized fabric in superposed relation in its structure and being superposed upon one face of the intermediate layer, and a work-engaging surface layer of heavy rubberized fabric superposed over the opposite face of the intermediate layer, all united into an integral flexible body which is compressible in thickness and substantially inextensible in length.

2. An improved endless impression pad for vulcanizing machines, comprising a relatively thick intermediate layer of rubber compound of a width substantially coextensive with the pad, a plurality of superposed layers of rubberized fabric in one portion of the pad on one side of the intermediate layer, and a work-engaging surface layer of heavy rubberized fabric on the other side of the intermediate layer, all united into an integral flexible body which is compressible in thickness and substantially inextensible in length.

3. An improved endless impression pad for vulcanizing machines, comprising a relatively thick intermediate layer of rubber compound, a strip of rubberized fabric coiled upon itself in multiple ply formation on one side of the intermediate layer, and a work-engaging surface layer of rubberized textile fabric on the other side of the intermediate layer, all united as an integral, compressible and substantially inextensible body.

4. An improved endless impression pad for vulcanizing machines, comprising a strip of rubberized fabric coiled upon itself in multiple ply formation with a substantial lap at the ends of the strip, sheet rubber strips stepping down one of said overlapping ends, a relatively thick layer of flexible rubber compound laid continuously upon the surface of the fabric and said rubber strips, and a fabric surface layer secured to the layer of rubber.

5. An improved endless impression pad for vulcanizing machines, comprising a relatively thick and endless intermediate layer of rubber compound of substantially uniform thickness except at one thinner section providing a recess within one face of the layer, an endless band including rubberized fabric in its structure and being superposed over the opposite face of the intermediate layer, a fabric sheet within the said recess, a work-engaging surface layer of heavy rubberized fabric superposed over the said one face and having the ends thereof superposed upon the fabric sheet, and means connecting said ends to each other and to the fabric sheet, all united as an integral, compressible and substantially inextensible body.

JAMES M. PATTERSON.